United States Patent
Bawiskar et al.

(10) Patent No.: US 12,486,390 B2
(45) Date of Patent: Dec. 2, 2025

(54) EPDM BLENDS WITH LONG CHAIN BRANCHING

(71) Applicant: Dow Global Technologies LLC, Midland, MI (US)

(72) Inventors: Santosh S. Bawiskar, Lake Jackson, TX (US); Guang Ming Li, Lake Jackson, TX (US); Tianzi Huang, Lake Jackson, TX (US); Lizhi Liu, Lake Jackson, TX (US); Xiaosong Wu, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 1010 days.

(21) Appl. No.: 17/622,069

(22) PCT Filed: Jun. 18, 2020

(86) PCT No.: PCT/US2020/038448
§ 371 (c)(1),
(2) Date: Dec. 22, 2021

(87) PCT Pub. No.: WO2020/263677
PCT Pub. Date: Dec. 30, 2020

(65) Prior Publication Data
US 2022/0251360 A1 Aug. 11, 2022

Related U.S. Application Data

(60) Provisional application No. 62/866,811, filed on Jun. 26, 2019.

(51) Int. Cl.
C08L 23/16 (2006.01)
(52) U.S. Cl.
CPC ......... C08L 23/16 (2013.01); *C08L 2205/025* (2013.01)
(58) Field of Classification Search
CPC .... C08L 23/16; C08L 2205/025; C08L 23/26; C08J 2323/16; C08F 210/18; C08F 8/00; C08F 210/06; C08F 236/20; C08F 2500/08; C08F 2500/09; C08F 2500/21; C08F 2500/26
See application file for complete search history.

(56) References Cited

U.S. PATENT DOCUMENTS

| | | |
|---|---|---|
| 3,563,870 A | 2/1971 | Tung et al. |
| 5,414,027 A | 5/1995 | DeNicola, Jr. et al. |
| 5,508,319 A | 4/1996 | DeNicola et al. |
| 5,541,236 A | 7/1996 | DeNicola, Jr. et al. |
| 5,605,936 A | 2/1997 | DeNicola, Jr. et al. |
| 5,674,613 A | 10/1997 | Dharmarajan et al. |
| 6,300,451 B1 | 10/2001 | Mehta et al. |
| 6,384,162 B1 | 5/2002 | Zahalka et al. |
| 6,699,919 B1 | 3/2004 | Charlier |
| 8,101,696 B2 | 1/2012 | Konze et al. |
| 2013/0303680 A1 | 11/2013 | Weaver et al. |
| 2014/0051809 A1 | 2/2014 | Tse |
| 2015/0259491 A1* | 9/2015 | LiPiShan ............... C08J 9/00 428/36.9 |
| 2018/0105626 A1* | 4/2018 | Fontaine ............... C08F 2/01 |
| 2018/0208757 A1 | 7/2018 | Jiang et al. |
| 2018/0223022 A1 | 8/2018 | Kiss et al. |
| 2019/0345318 A1* | 11/2019 | LiPiShan ............... C08L 23/16 |

FOREIGN PATENT DOCUMENTS

| | | | |
|---|---|---|---|
| EP | 0519386 A1 | 12/1992 | |
| EP | 3559114 B1 * | 4/2024 | ........... C08F 210/18 |
| JP | H04-216803 A | 8/1992 | |
| JP | H08-311265 A | 11/1996 | |
| WO | WO-2017210195 A1 * | 12/2017 | ........... C08F 210/02 |
| WO | WO-2018119570 A1 * | 7/2018 | ........... C08F 210/18 |

OTHER PUBLICATIONS

Jourdain (E. Jourdain, et al, New approach to EPDM sponge profile formulations with metallocene elastomers, Rubberword.com, 2016, p. 28-33).*
Product data sheet of Vistalon 7602 downloaded on Jan. 17, 2024.*
E. Jourdain, et al., EPDM sponge profile formulations: New approach with metallocene elastomers, RubberWorld, May 2016, vol. 254, No. 2, pp. 28-33.

* cited by examiner

*Primary Examiner* — Kumar R Bhushan
(74) *Attorney, Agent, or Firm* — Boyle Fredrickson S.C.

(57) ABSTRACT

The present disclosure provides a composition. In an embodiment, the composition includes a non-irradiated ethylene/propylene/non-conjugated polyene terpolymer (nr-terpolymer) and a branched ethylene/propylene/non-conjugated polyene terpolymer (b-terpolymer). The b-terpolymer has: (A) a Mooney viscosity (ML 1+4 @ 125° C.) from 35 MU to 120 MU; (B) a rheology ratio from 55 to 110; and (C) a phase angle δ from 20° to 39°.

14 Claims, No Drawings

EPDM BLENDS WITH LONG CHAIN BRANCHING

BACKGROUND

Known are ethylene-propylene-diene monomer terpolymers (EPDM) having a molecular architecture that includes long chain branching (LCB). LCB introduces side chains into the backbone of the EPDM that alter the rheological and physical properties of the EPDM significantly, e.g., the elasticity and shear thinning character of the EPDM is increased with LCB. The benefits of high-LCB EPDM compared to non-branched EPDM include reduced cold flow, higher green strength, higher collapse resistance during extrusion of hollow parts, better foamability, faster extrusion rates, faster mixing, lower energy consumption in internal mixers, higher filler loading and reduced melt fracture.

The choice of catalyst used in the polymerization and the polymerization process conditions provide methods of adapting the level of LCB in the EPDM architecture. Ziegler Natta (Z-N) catalysts (e.g., titanium-based catalyst or vanadium-based catalyst), can introduce LCB into an EPDM during the polymerization process. However, the extent of LCB is difficult to control, e.g., the Z-N polymerization process is prone to forming undesirable crosslinked EPDM that leads to gel formation. The Z-N polymerization process also produces EPDM with broad composition distribution and broad molecular weight distribution.

Metallocene catalysts (e.g., zirconium based catalyst), produce EPDM in a solution polymerization process. Metallocene catalysts generally produce EPDM having a more uniform composition distribution, narrower MWD and a more linear molecular architecture compared to Z-N catalyzed EPDM. However, metallocene catalysts typically produce low levels of LCB compared to Z-N catalyzed EPDM.

Consequently, the art recognizes the need for high-LCB EPDM. The art further recognizes the need for methods of increasing LCB in metallocene catalyzed EPDM.

SUMMARY

Disclosed herein is a composition. In an embodiment, the composition includes a branched ethylene/propylene/non-conjugated polyene terpolymer (b-terpolymer) and a non-irradiated ethylene/propylene/non-conjugated polyene terpolymer (nr-terpolymer). The b-terpolymer has: (A) a Mooney viscosity (ML 1+4 @ 125° C.) from 35 MU to 120 MU; (B) a rheology ratio from 55 to 110; and (C) a phase angle $\delta$ from 20° to 39°.

Definitions

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups.

For purposes of United States patent practice, the contents of any referenced patent, patent application or publication are incorporated by reference in their entirety (or its equivalent U.S. version is so incorporated by reference), especially with respect to the disclosure of definitions (to the extent not inconsistent with any definitions specifically provided in this disclosure) and general knowledge in the art.

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percentages are based on weight and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, (whether polymerized or otherwise), unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer," is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra-low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. In an embodiment, the ethylene-based polymer does not contain an aromatic comonomer polymerized therein.

The terms "interpolymer," and "copolymer," refer to a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

The term "electron beam radiation" or ("e-beam")," as used herein, includes generating an electron beam from a heated cathode filament (typically tungsten). The electrons emitted from the cathode are accelerated in an electric field applied between cathode and anode. The energy gain of the electron beam is proportional to the acceleration voltage. The energy is measured in eV (electron-volts) and accelerators up to 10 MeV are commercially available. The dosage of e-beam is measured in megarad (MRad). When e-beam enters a polymer it ionizes and excites the molecules resulting in the displacement of hydrogen atoms and formation of free radicals. The combination of two free radicals forms branching. The type of branching formed by this method is H-type or tetrafunctional.

The term "entanglement molecular weight," as used herein, is described as follows. A plot of the log of structurally undeformed mechanical properties of a polymer melt plotted against the log of molecular weight exhibits an initial, weak linear dependence followed by a transition, at approximately 10 kDa, to exhibit a strong dependence on molecular weight. The "transition molecular weight" is termed the "entanglement molecular weight." Polymers above the entanglement molecular weight are useful as plastics while those below the entanglement molecular weight display features of low molecular weight materials, generally brittle powders. For example, candle wax is low molecular weight polyolefin of the same molecular structure as polyethylene.

The term "long-chain branching," or ("LCB")," as used herein, refers to the presence of side chains on an ethylene/propylene/diene-monomer terpolymer with the side chain molecular weight being greater than the entanglement molecular weight of the polymer.

The term "polymer," refers to a material prepared by reacting (i.e., polymerizing) a set of monomers, wherein the set is a homogenous (i.e., only one type) set of monomers or a heterogeneous (i.e., more than one type) set of monomers. The term polymer as used herein includes the term "homopolymer", which refers to polymers prepared from a homogenous set of monomers, and the term "interpolymer" as defined below.

The term "terpolymer," refers to a polymer prepared by the polymerization of three different types of monomers.

Test Methods

Density is measured in accordance with ASTM D792, Method B. The result is recorded in grams per cubic centimeter (g/cc or g/cm$^3$).

Mooney viscosity test: EPDM Rubber Mooney Viscosity is measured in a Mooney shearing disk viscometer in accordance with ASTM 1646-04. The instrument is an Alpha Technologies Mooney Viscometer 2000. The torque to turn the rotor at 2 rpm is measured by a torque transducer. The sample is preheated for 1 minute (min) after the platens is closed. The motor is then started and the torque is recorded for a period of 4 min. Results are reported as "ML (1+4) at 125° C." in Mooney Units (MU). The term "ML" indicates that a large rotor, "Mooney Large," is used in the viscosity test, where the large rotor is the standard size rotor. Mooney viscosity (MV) measures the resistance of polymer to flow at a relatively low shear rate and indicates the flowability of the polymer.

Mooney relaxation area (MLRA) data is obtained from the Mooney viscosity measurement where the test sample is relaxed after the rotor is stopped. At the end of the Mooney viscosity test, rotation of the disk is stopped within 0.1 seconds (s). Collection of relaxation data typically begins 1 s after the rotor is stopped and continues for at least 2 minutes (min) after the rotor is stopped. The MLRA value reported is the integrated area under the Mooney torque-relaxation time curve from 1 s to 120 s (MLRA (1'+4'+2')). The MLRA value indicates the degree of elasticity of a polymer and can be regarded as a stored energy term. Higher MRLA values indicate that, after the removal of an applied strain, the test sample stores more energy and requires more time to relax (i.e., to dissipate the stored energy). Polymers with more elasticity (e.g., those with more long chain branched structure), typically exhibit higher MLRA values compared to less elastic polymers (e.g., those having less long chain branched structure). MLRA is reported in Mooney Unit-seconds (MU.$).

The term "MLRA/ML ratio," as used herein, is the Mooney Relaxation Area-to-Mooney viscosity ratio and is an abbreviated form for "MLRA/ML(1+4)@125° C." The MLRA/ML ratio indicates the degree of melt elasticity of a polymer and is directly proportional to the degree of melt elasticity. The MLRA/ML ratio is reported in seconds (s).

Rubber rheology property analysis: Rubber rheology properties analysis is performed in accordance with ASTM D6204 with a rotorless oscillating shear rheometer (i.e., rubber process analyzer (RPA)). RPA frequency sweep test is performed using an Alpha Technologies RPA 2000. The testing sample is cut out with a Cutter 2000R. Sample size is between 5 and 7 grams. The test specimen is considered to be of proper size (116 to 160% of the test cavity volume) when a small bead of rubber compound is extruded uniformly around the periphery of the dies as they are closed. The sample is placed between two pieces of Mylar film. A frequency sweep is performed at 125° C. using a 5% strain for the neat terpolymers. A frequency sweep is performed at 100° C. using a 5% strain for the terpolymer compositions. The frequency range is from 0.1 radians per second (rad/s) to 100 rad/s. The stress response was analyzed in terms of amplitude and phase, from which, the storage shear modulus (G'), loss shear modulus (G"), complex viscosity (V), tan delta (i.e., phase angle δ), and complex shear modulus G* were calculated. Modulus values are reported in kilopascal (kPa), phase angle is reported in degrees, and viscosity is reported in pascal-seconds (Pa·s).

The term "phase angle δ," as used herein, is the phase lag exhibited between an applied stress and the resultant strain imparted by the stress. For a given dynamic mechanical study, the phase angle δ is measured at a complex shear modulus, G*, value of 100 kPa and 125° C. When comparing the phase angle δ of a group of polymers, decreased phase angle δ values generally indicate a polymer is more elastic.

The term "rheology ratio" (or "RR"), is calculated as the ratio of the complex viscosity at 0.1 rad/sec and 125° C. to the complex viscosity at 100 rad/sec and 125° C.; RR equals V0.1/V100 at 125° C.

High Temperature Gel Permeation Chromatography test ("HT GPC test"): The HT GPC test is conducted with a POLYMERCHAR (Valencia, Spain) HT GPC system consisting of an infra-red concentration/composition detector (IR-5 detector), a PDI 2040 laser light scattering detector (Agilent), and a four capillary bridge viscometer (Malvern) and allows determination of number average molecular weight ($M_N$), weight average molecular weight ($M_W$), and zeta average molecular weight ($M_Z$).

The columns are four mixed A LS 20 micrometer columns (Agilent). The detector compartments are operated at 160° C. and the column compartment is operated at 150° C. The carrier solvent is 1,2,4-trichlorobenzene (TCB) containing approximately 250 ppm of butylated hydroxytoluene (BHT) and is nitrogen sparged.

The HT GPC system is calibrated with 21 narrow molecular weight distribution polystyrene standards. The molecular weights of the standards ranges from 580 to 8,400,000 and are arranged in six 6 "cocktail" mixtures having at least a decade of separation between individual molecular weights. Molecular weight data ($M_{ps}$), of the resultant polystyrene standards is converted to polyethylene molecular weight data ($M_{pe}$), by the equation (1): $M_{pe}=A(M_{ps})^B$; where the value of A is determined in an iterative manner and is approximately 0.42 and the value of B is 1.0. A fifth order polynomial was used to fit the respective polyethylene-equivalent calibration points obtained from the equation (1) to their observed elution volumes for each polystyrene standard.

$M_N$, $M_W$, and $M_Z$ are calculated according to the following equations:

$$Mn = \frac{\sum_i Wf_i}{\sum_i (Wf_i / M_i)} \quad (2)$$

$$Mw = \frac{\sum_i (Wf_i * M_i)}{\sum_i Wf_i} \quad (3)$$

$$Mz = \frac{\sum_i (Wf_i * M_i^2)}{\sum_i (Wf_i * M_i)} \quad (4)$$

where, $Wf_i$ is the weight fraction of the i-th elution component and $M_i$ is the molecular weight of the i-th elution component. The molecular weight distribution (MWD) is expressed as the ratio of $M_W$ to $M_N$; $M_W/M_N$. The A value is determined by adjusting A value in equation (1) until the value of Mw from equation (3), and the corresponding retention volume polynomial, agree with the independently determined value of Mw obtained in accordance with a linear homopolyethylene reference having a known $M_W$ of 120,000 and intrinsic viscosity (1.873 dL/g). The same linear homopolyethylene reference was used to determine the response factors of the IR-5 detector, the laser light scattering detector, and the viscometer. Determination of the response factors is implemented in a manner consistent with that published in the American Chemical Society Publications: "A Strategy for Interpreting Multidetector Size-Exclusion Chromatography Data I," in "Chromatography of Polymers (ACS Symposium Series, #521)," T. H. Mourey and S. T. Balke, Chap 12, p 180, (1993); and "A Strategy for Interpreting Multidetector Size-Exclusion Chromatography Data II," in "Chromatography of Polymers (ACS Symposium Series, #521)." S. T. Balke, R. Thitiratsakul, R. Lew, P. Cheung, T. H. Mourey, Chap 13, p 199, (1993) the entire contents of both which is incorporated by reference herein. The IR-5 detector was further calibrated with EPDM resins before e-beam treatment.

For the irradiated terpolymers (i.e., terpolymers exposed to e-beam treatment), candidates for HT GPC analysis are picked randomly and cut into segments. A blend of segments cut from various terpolymers is used to prepare each HT GPC analyte in order to overcome any radiation heterogeneity within individual terpolymer samples. HT GPC analytes are prepared at a concentration of approximately of 2.0 milligrams per milliliter (mL) using approximately 60 milligrams of cut segments and 30 mL TCB dissolved in a glass bottle having a cap with an aluminum foil liner. The analytes are heated at 150° C. for 3 h with gentle agitation and hot-transferred into injection vials. The solution in the injection vial is then heated at 160° C. for 30 min prior to injection. The injection volume is 200 microliters and the flowrate is 1.0 mL per min. The analytes are filtered upon injection, via an in-line filter to remove insoluble materials.

The term, "initial analyte," as used herein, is the mass of the analyte injected into the HT GPC system. The term, "filtered analyte," as used herein, is the mass of the analyte that exits the in-line filter and is recovered from the IR-5. A weight fraction for a "soluble fraction," is the result of the filtered analyte divided by the initial analyte. For samples with insoluble fractions, the reported values are only for the soluble portion of the analyte.

The four capillary bridge viscometer measures an intrinsic viscosity ($\eta$) of the analyte. A g' value of the analyte is calculated as $\eta$ divided by $\eta_{linear}$, (i.e., $g'=\eta/\eta_{linear}$), where $\eta_{linear}$ is the intrinsic viscosity of a linear polymer having the same molecular weight.

Mass recovery test: Mass recovery (M-REC) is calculated by the expression M-REC=100×[(initial analyte−filtered analyte)/initial analyte] using the analyte mass values obtained in the HT GPC test.

It is understood that polymers with internal crosslinking form insoluble gels that are quantifiably detectable by mass recovery analysis. It is further understood that polymers exhibiting mass recovery of greater than, or equal to, 85% are absent of internal crosslinking.

The g' value of irradiated terpolymers is used to calculate the amount of long chain branching. The change of the g' value (i.e., the ratio of the g' value of the irradiated terpolymer divided by the g' value of the same, non-irradiated terpolymer), is calculated following the pioneering study of long chain branching by Zimm and Stockmeyer, "The Dimensions of Chain Molecules Containing branches and Rings," B. H. Zimm, W. H. Stockmayer, The Journal of Chemical Physics, Vol. 17, page 1301-1314, 1949, the entire contents of which is incorporated by reference herein. The g value used in the reference was converted to g' value using the following equation with an emperical value of 0.5:

$$g^e = g'$$

Based on the calculated g' values, the long chain branching per chain of each resin was calculated based on the linear correlation of the branching number of tetra-functional (H-shaped) branched polymer and g values by Zimm and Stockmayer.

Monomer content test: Ethylene content and propylene content of the terpolymers, as weight percentage, is determined by Fourier Transform Infrared (FTIR) analysis in accordance with ASTM D3900. ENB content of the terpolymers as a weight percentage is determined by Fourier Transform Infrared (FTIR) analysis in accordance with ASTM D6047.

Residual elemental analysis test: Residual elemental analysis is performed using both Inductively Coupled Plasma-Atomic Emission Spectroscopy (ICP-AES) and X-ray Fluorescence (XRF) techniques. For ICP-AES analysis, the samples are weighed into quartz tubes and 1 mL water and 3 mL nitric acid are added to the samples. The samples are placed in a hot block at 115° C. for 30 minutes. The samples are then placed in an UltraWave Microwave oven where they are digested at 250° C. After digestion in the microwave, the samples are diluted and analyzed by a Perkin Elmer ICP for aluminum, calcium, chromium titanium and vanadium. For XRF analysis, the samples are plagued in a hot press at 260° F. The samples are then rinsed with distilled water and then with acetone and chlorine content is measured by XRF. Results are reported in parts per million (ppm).

DETAILED DESCRIPTION

Disclosed herein is a composition. In an embodiment, the composition includes a non-irradiated ethylene/propylene/non-conjugated polyene terpolymer and a branched ethylene/propylene/non-conjugated polyene terpolymer (b-terpolymer). The b-terpolymer has: (A) a Mooney viscosity (ML 1+4 @ 125° C.) from 35 MU to 120 MU; (B) a rheology ratio from 55 to 110; and (C) a phase angle δ from 20° to 39°.

The composition includes a non-irradiated ethylene/propylene/non-conjugated polyene terpolymer (nr-terpolymer). The term "nr-terpolymer," as used herein, is an ethylene/α-olefin/non-conjugated polyene terpolymer that is not subjected to, or otherwise not exposed to, electron beam radiation. In an a embodiment, the nr-terpolymer is an ethylene/α-olefin/non-conjugated polyene comprising, in polymerized form, ethylene, an α-olefin, and a non-conjugated polyene. Suitable examples of α-olefins include C3-C20 α-olefins or C3-C8 α-olefins. Suitable examples of non-conjugated polyenes include C4-C40 non-conjugated dienes.

In an embodiment, the α-olefin is a C3-C8 aliphatic α-olefin. In a further embodiment, the α-olefin is selected from the group consisting of propylene, 1-butene, 1-hexene and 1-octene.

In an embodiment, the α-olefin is propylene.

In an embodiment, the non-conjugated polyene is an acyclic diene or a cyclic diene. Nonlimiting examples of acyclic dienes include straight chain acyclic dienes, such as 1,4-hexadiene and 1,5-heptadiene; and branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, and 1,9-deca-diene and mixed isomers of dihydromyrcene. Nonlimiting examples of cyclic dienes include monocyclic dienes such as 1,4-cyclohexadiene, 1,5-cyclooctadiene and 1,5-cyclododecadiene; multi-ring alicyclic fused and bridged ring diener, such as tetrahydroindene and methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene.

In an embodiment, the non-conjugated polyene is absent a heteroatom. The term "heteroatom," as used herein, is an atom other than carbon or hydrogen. The heteroatom can be a non-carbon atom from Groups IV, V, VI and VII of the Periodic Table. Nonlimiting examples of heteroatoms include: F, N, O, P, B, S, and Si.

In an embodiment, the non-conjugated polyene is ENB.

In an embodiment, the nr-terpolymer comprises only one type of non-conjugated polyene. The single type of non-conjugated polyene being void of, or otherwise absent of a heteroatom.

In an embodiment, the nr-terpolymer is a non-irradiated ethylene/propylene/norbornene terpolymer. In a further embodiment, the nr-terpolymer is a non-irradiated ethylene/propylene/ENB terpolymer. The term "nr-EPDM," as used herein, is the non-irradiated ethylene/propylene/ENB terpolymer having only three monomers, and the ENB being the sole diene in the terpolymer.

Neat Terpolymer

In an embodiment, the nr-terpolymer is a neat nr-terpolymer. The term "neat," as used herein, indicates a material that has no oil within, or upon, its structure. The term "neat," as used herein, interchangeably indicates a material that is "oil-free." In an embodiment, the nr-EPDM is a neat nr-EPDM.

In an embodiment, nr-EPDM used herein is produced with a metallocene catalyst as described in U.S. Pat. No. 8,101,696 the entire contents of which is incorporated by reference herein.

The nr-EPDM used herein may have a semi-crystalline, free flowing particulate form or an amorphous form.

In an embodiment, the nr-EPDM has the amorphous form and has the shape of a block, or a bale. The bale of the amorphous nr-EPDM has a thickness which is the length of the longest side of the bale. In an embodiment, the thickness of the bale is from 10 centimeters (cm), or 12 cm, or 14 cm, or 15 cm to 16 cm, or 18 cm, or 20 cm, or 22 cm.

In an embodiment, the nr-EPDM comprises from 50 weight percent (wt %), or 55 wt %, or 60 wt %, or 68 wt % to 70 wt %, or 72 wt %, or 74 wt %, or 80 wt % polymerized ethylene. In a further embodiment, the nr-EPDM comprises from 50 to 80 wt %, or from 50 to 72 wt % polymerized ethylene. In an embodiment, the nr-EPDM comprises from 23 wt %, or 25 wt %, to 27 wt %, or 30 wt %, or 35 wt %, or 38 wt % polymerized propylene. In a further embodiment, the nr-EPDM comprises from 23 to 38 wt %, or from 25 to 35 wt %, or from 25 to 30 wt % polymerized propylene. In an embodiment, the nr-EPDM comprises from 3 wt %, or 3.5 wt %, or 4 wt %, or 4.5 wt %, or 4.6 wt % to 5.1 wt %, or 5.5 wt %, or 6 wt %, or 7 wt %, or 8 wt %, or 8.5 wt %, or 9 wt %, or 10 wt %, or 12 wt % polymerized ENB. In a further embodiment, the nr-EPDM comprises from 4 to 12 wt %, or from 4.5 to 12 wt % or from 4.5 to 10 wt % polymerized ENB. Weight percentages are based upon a total weight of the nr-EPDM.

The nr-EPDM has a Mooney viscosity less than 100 MU. In an embodiment, the nr-EPDM has a Mooney viscosity from 20 MU, or 30 MU, or 40 MU, or 50 MU, or 60 MU, or 65 MU, or 70 MU to 80 MU, or 85 MU, or 90 MU, or 99 MU. In a further embodiment, the nr-EPDM has a Mooney viscosity from 40 to 99 MU, or from 50 to 88 MU, or from 60 to 85 MU.

In an embodiment, the nr-EPDM has a Mooney relaxation area (MLRA), from 150 Mooney unit-seconds (MU·s), or 170 MU·s, or 200 MU·s, or 225 MU·s to 275 MU·s, or 300 MU·s, or 370 MU·s, or 480 MU·s, or 600 MU·s. In a further embodiment, the nr-EPDM has a MLRA from 150 to 600 MU·s, or from 200 to 480 MU·s.

In an embodiment, the nr-EPDM has an MLRA/ML ratio from 1 second (s), or 2 s, or 3 s, or 3.3 s to 4 s or 4.5 s or 5 s, or 6 s, or 6.5 s, or 7 s, or 7.5 s or 8 s. In a further embodiment, the nr-EPDM has an MLRA/ML ratio from 1 to 8 s, or from 2 to 7.5 s, or from 3 to 7.2 s.

In an embodiment, the nr-EPDM has a rheology ratio (RR) from 30, or 35, or 40 or to 45, or 50, or 55, or 60, or 65, or 70, or 75. In a further embodiment, the nr-EPDM has an RR from 30 to 75, or from 35 to 70, or from 40 to 65.

The nr-EPDM has a phase angle δ greater than, or equal to, 41°. In an embodiment, the nr-EPDM has a phase angle δ from 41°, or 45° to 50° to 60°, or 65°, or 75°. In a further embodiment, the nr-EPDM has a phase angle δ from 41° to 75°, or from 41° to 60°, or from 41° to 50°.

The nr-EPDM has a phase angle δ greater than, or equal to, 41°. In an embodiment, the nr-EPDM has a phase angle δ from 41°, or 45° to 50° to 60°, or 65°, or 75°. In a further embodiment, the nr-EPDM has a phase angle δ from 41° to 75°, or from 41° to 60°, or from 41° to 50°.

The nr-EPDM has a zero shear viscosity that is the complex viscosity measured at 0.1 inverse seconds (1/s) and 125° C. The zero shear viscosity is reported in kilopascal-seconds (kPa·s). In an embodiment, the nr-EPDM has a zero shear viscosity from 225 kPa·s, or 251 kPa·s, or 304 kPa*s to 322 kPa·s, or 330 kPa·s, or 360 kPa·s. In a further embodiment, the nr-EPDM has a zero shear viscosity from 225 to 360 kPa·s, or from 251 to 330 kPa·s, or from 304 to 322 kPa·s.

In an embodiment, the nr-EPDM has a density from greater than, or equal to 0.85 g/cc, or 0.86 g/cc to less than, or equal to, 0.88 g/cc or 0.89 g/cc. In a further embodiment, the nr-EPDM has a density from 0.85 to less than 0.89 g/cc, or from 0.86 to 0.88 g/cc.

In an embodiment, the nr-EPDM has a vanadium content from greater than, or equal to, 0 parts per million (ppm), or 0.1 ppm to less than, or equal to, 0.7 ppm or 0.82 ppm, or 0.9 ppm. In a further embodiment, the nr-EPDM has a vanadium content from 0 to 0.9 ppm or from 0 ppm to less than 0.82 ppm. In an embodiment, the nr-EPDM comprises vanadium in an amount less than 0.82 ppm.

In an embodiment, the nr-EPDM has a chlorine content from greater than, or equal to, 0 parts per million (ppm), or 10 ppm to 15 ppm, or 30 ppm. In a further embodiment, the nr-EPDM has a chlorine content from 0 to 30 ppm or from 0 to 15 ppm.

In an embodiment, the nr-EPDM has a molecular weight distribution (MWD) from 1.8, or 2.0, or 2.2, or 2.4, or 2.6 to 3.1, or 3.2, or 3.5, or 4.0, or 5.0. In a further embodiment, the nr-EPDM has an MWD from 1.8 to 5.0, or from 2.0 to 4.0, or from 2.2 to 3.5, or from 2.3 to 3.1.

The nr-EPDM may comprise a combination of two or more embodiments as described herein.

Branched Terpolymer

The composition includes a branched terpolymer (b-terpolymer). The term "b-terpolymer," as used herein, is an ethylene/α-olefin/non-conjugated polyene terpolymer that has been subjected to, or otherwise exposed to, electron beam radiation at a dosage from 0.2 to 1.3 megaRad (MRad). In an a embodiment, the b-terpolymer is an irradiated ethylene/α-olefin/non-conjugated polyene comprising, in polymerized form, ethylene, an α-olefin, and a non-conjugated polyene. The α-olefin of the branched ethylene/α-olefin/non-conjugated polyene terpolymer is any α-olefin as described herein. The non-conjugated polyene of the branched ethylene/α-olefin/non-conjugated polyene terpolymer is any non-conjugated polyene as described herein.

In an embodiment, the b-terpolymer is a branched ethylene/propylene/ENB terpolymer. The term, "b-EPDM," as used herein, is the branched ethylene/propylene/ENB terpolymer having only three monomers, and the ENB being the sole diene in the terpolymer. In a further embodiment, the b-terpolymer (b-EPDM) is formed by way of electron beam radiation as disclosed in U.S. Patent Application No. 62/866,766, filed on Jun. 26, 2019, the entire contents of which is incorporated by reference herein.

In an embodiment, the b-EPDM is a neat b-EPDM.

In an embodiment, the b-EPDM is a gel-free b-EPDM.

In an embodiment, the b-EPDM has been exposed to electron beam radiation at a dosage from 0.2 MRad, or 0.3 MRad, or 0.4 MRad to 0.5 MRad, or 0.6 MRad, or 0.7 MRad, or 0.8 MRad, or 0.9 MRad, or 1 MRad, or 1.1 MRad, or 1.2 MRad, or 1.3 MRad, or 1.5 MRad to produce the b-EPDM. In a further embodiment, the b-EPDM has been exposed at a dosage from 0.2 to 1.3 MRad, or from 0.3 to 1.2 MRad, or from 0.3 to 0.9 MRad, or from 0.3 to 0.7 MRad, or from 0.4 to 0.5 MRad to produce the b-EPDM.

In an embodiment, the b-EPDM has been exposed to electron beam radiation for a dosage time from 1 millisec-onds (ms), or 2 ms, or 4 ms, or 6 ms, or 8 ms, or 10 ms to 12 ms, or 14 ms, or 18 ms, or 20 ms, or 30 ms, or 100 ms. In a further embodiment, the b-EPDM has been exposed for a dosage time from 1 to 100 ms, or from 2 to 30 ms, or from 4 to 20 ms, or from 10 to 20 ms.

In an embodiment, the b-EPDM comprises from 50 wt %, or 55 wt %, or 60 wt %, or 68 wt % to 70 wt %, or 72 wt %, or 74 wt %, or 80 wt % polymerized ethylene. In a further embodiment, the b-EPDM comprises from 50 to 80 wt %, or from 50 to 72 wt % polymerized ethylene. In an embodiment, the b-EPDM comprises from 23 wt %, or 25 wt %, to 27 wt %, or 30 wt %, or 35 wt %, or 38 wt % polymerized propylene. In a further embodiment, the b-EPDM comprises from 23 to 38 wt %, or from 25 to 35 wt %, or from 25 to 30 wt % polymerized propylene. In an embodiment, the b-EPDM comprises from 3 wt %, or 3.5 wt %, or 4 wt %, or 4.5 wt %, or 4.6 wt % to 5.1 wt %, or 5.5 wt %, or 6 wt %, or 7 wt %, or 8 wt %, or 8.5 wt %, or 9 wt %, or 10 wt %, or 12 wt % polymerized ENB. In a further embodiment, the b-EPDM comprises from 4 to 12 wt %, or from 4.5 to 12 wt % or from 4.5 to 10 wt % polymerized ENB. Weight percentages are based upon a total weight of the b-EPDM. Bounded by no particular theory, it is believed that the b-EPDM has negligible reduction in ENB content compared to the nr-EPDM. The lack of decrease in ENB content indicates an absence of crosslinking in the b-EPDM.

In an embodiment, the b-EPDM has a Mooney viscosity from 25 MU, or 35 MU, or 45 MU, or 55 MU, or 75 MU, or 95 MU, or 100 MU, or 105 MU, or 110 MU to 115 MU, or 120 MU, or 122 MU, or 125 MU, or 130 MU, or 135 MU. In a further embodiment, the b-EPDM has a Mooney viscosity from 25 to 135 MU, or from 35 to 120 MU, or from 45 to 110 MU.

In an embodiment, the b-EPDM has a Mooney relaxation area (MLRA), from 220 MU·s, or 280 MU·s, or 315 MU·s, or 1000 MU·s, 1600 MU·s, 1700 MU·s, or 1790 MU·s to 1850 MU·s, or 2000 MU·s, or 2300 MU·s, or 2700 MU·s, or 3000 MU·s, or 3300 MU·s. In a further embodiment, the b-EPDM has a MLRA from 220 to 3300 MU·s, or from 280 to 3000 MU·s, or from 1600 to 3000 MU·s, or from 1790 to 2700 MU·s, or from 315 to 940 MU·s.

In an embodiment, the b-EPDM has an MLRA/ML ratio from 7 s, or 8 s, or 9 s, or 10 s, or 12 s, or 13 s, or 14 s to 20 s, or 22 s, or 25 s, or 30 s. In a further embodiment, the b-EPDM has a MLRA/ML value from 7 to 30 s, or 10 to 30 s, or from 12 to 25 s, or from 14 to 22 s, or from 10 to 15 s. The b-EPDM has an increased MLRA/ML ratio compared to the nr-EPDM. Bounded by no particular theory, the MLRA/ML ratio is considered as a relaxation time associated with the degree of melt elasticity of the terpolymer. Long chain branching (LCB), can slow relaxation of the terpolymer and increase the MLRA/ML ratio. The increased MLRA/ML ratio indicates that the b-EPDM contains more LCB compared to the nr-EPDM.

In an embodiment, the b-EPDM has a rheology ratio (RR) from 55, or 60, or 70, or 75, or 80, or 90 to 95, or 98, or 105, or 110, or 115, or 125, or 130, or 140, or 150. In a further embodiment, the b-EPDM has an RR from 55 to 150, or from 60 to 105, or from 70 to 100, or from 80 to 95. The b-EPDM has an increased RR value compared to the nr-EPDM. Bounded by no particular theory, the increased RR value indicates that the b-EPDM is more highly shear thinning compared to the nr-EPDM. The increased RR value indicates that the b-EPDM contains more LCB compared to the nr-EPDM.

In an embodiment, the b-EPDM has a phase angle δ from 20°, or 22°, or 25°, or 26° to 28°, or 30°, or 33°, or 35°, or 37°, or 39°. In a further embodiment, the b-EPDM has a phase angle δ from 20° to 39°, or from 22° to 37°, or from 25° to 35°. The b-EPDM has a decreased phase angle δ compared to the nr-EPDM. Bounded by no particular theory, it is believed that the decreased phase angle δ indicates the b-EPDM is more elastic compared to the nr-EPDM.

The b-EPDM has a zero shear viscosity that is the complex viscosity measured at 0.1 inverse seconds (1/s) and 125° C. In an embodiment, the b-EPDM has a zero shear viscosity from 135 kPa·s, or 151 kPa·s, or 455 kPa·s to 460 kPa·s, or 826 kPa·s, or 900 kPa·s. In a further embodiment, the b-EPDM has a zero shear viscosity from 135 to 900 kPa·s, or from 151 to 826 kPa·s.

In an embodiment, the b-EPDM has a density from greater than, or equal to 0.85 g/cc, or 0.86 g/cc to less than, or equal to, 0.88 g/cc or 0.89 g/cc. In a further embodiment, the b-EPDM has a density from 0.85 to less than 0.89 g/cc, or from 0.86 to 0.88 g/cc.

In an embodiment, the b-EPDM has a vanadium content from greater than, or equal to, 0 parts per million (ppm), or 0.1 ppm to less than, or equal to, 0.7 ppm or 0.82 ppm, or 0.9 ppm. In a further embodiment, the b-EPDM has a vanadium content from 0 to 0.9 ppm or from 0 ppm to less than 0.82 ppm. In an embodiment, the b-EPDM comprises vanadium in an amount less than 0.82 ppm.

In an embodiment, the b-EPDM has a chlorine content from greater than, or equal to, 0 parts per million (ppm), or 10 ppm to 15 ppm, or 30 ppm. In a further embodiment, the b-EPDM has a chlorine content from 0 to 30 ppm or from 0 to 15 ppm.

In an embodiment, the b-EPDM has an MWD from 2.3, or 2.6, or 3.0, or 3.3 to 4.2, or 5.6, or 6. In a further embodiment, the b-EPDM has an MWD from 2.3 to 6, or from 2.6 to 5.6, or from 3.3 to 4.2.

In an embodiment, the b-EPDM has a mass recovery as determined by the HT GPC test. In an embodiment, the b-EPDM has a mass recovery greater than, or equal to, 80%. In a further embodiment, the b-EPDM has a mass recovery from 80%, or 85%, or 90% to 95%, or 96%, or 97%, or 98%, or 99%, or 100%. In another embodiment, the b-EPDM has a mass recovery from 80% to 100%, or from 85% to 100%, or from 97% to 100%.

The b-EPDM may comprise two or more embodiments disclosed herein.

Composition

In an embodiment, the composition comprises the non-irradiated terpolymer (nr-EPDM), in an amount from 5 wt %, or 10 wt %, or 20 wt %, or 30 wt %, or 40 wt %, or 50 wt % to 60 wt %, or 70 wt %, or 80 wt %, or 90 wt %, or 95 wt % based a total weight of the composition. In a further embodiment, the composition comprises the nr-EPDM in an amount from 10 to 90 wt %, or from 20 to 80 wt %, or from 30 to 70 wt %, or from 40 to 60 wt % based a total weight of the composition. In another embodiment, the composition comprises 50 wt % of the nr-EPDM based a total weight of the composition. In an embodiment, the composition comprises the branched terpolymer (b-EPDM), in an amount from 5 wt %, or 10 wt %, or 20 wt %, or 30 wt %, or 40 wt %, or 50 wt % to 60 wt %, or 70 wt %, or 80 wt %, or 90 wt %, or 95 wt % based a total weight of the composition. In a further embodiment, the composition comprises the b-EPDM in an amount from 10 to 90 wt %, or from 20 to 80 wt %, or from 30 to 70 wt %, or from 40 to 60 wt % based a total weight of the composition. In another embodiment, the composition comprises 50 wt % of the b-EPDM based a total weight of the composition.

In an embodiment, the composition has a Mooney viscosity from 74 MU, or 75 MU, or 78 MU, or 79 MU, or 80 MU, or 83 MU, or 85 MU, or 90 MU to 91 MU, or 95 MU to 100 MU, or 105 MU, or 108 MU, or 112 MU, or 115 MU, or 120 MU. In a further embodiment, the composition has a Mooney viscosity from 74 to 120 MU, or from 79 to 120 MU, or from 80 to 115 MU, or from 79 to 108 MU, or from 91 to 108 MU.

In another embodiment, the composition has a Mooney viscosity from 95 to 115 MU. In another embodiment, the composition has a Mooney viscosity from 74 to 90 MU, or from 75 to 85 MU. In another embodiment, the composition has a Mooney viscosity from 80 to 90 MU.

In an embodiment, the composition has a Mooney relaxation area (MLRA), from 715 MU·s, or 720 MU·s, or 750 MU·s, or 1000 MU·s to 1100 MU·s, or 1270 MU·s, or 1300 MU·s, or 1500 MU·s. In a further embodiment, the composition has a MLRA from 715 to 1500 MU·s, or from 720 to 1300 MU·s, or from 750 to 1270 MU·s.

In an embodiment, the composition has an MLRA/ML ratio from 9.6 s, or 9.7 s, or 10.0 s, or 11.0 s to 12.0 s, or 14.0 s, or 16.0 s, or 20.0 s. In a further embodiment, the composition has a MLRA/ML value from 9.6 to 20.0 s, or from 9.7 to 16.0 s, or from 10.0 to 14.0 s.

In an embodiment, the composition has a rheology ratio (RR) from 67, or 70, or 71, or 72, or 77, or 80, or 82, or 87, or 90 to 92, or 95, or 98, or 105, or 110, or 115, or 125. In a further embodiment, the composition has an RR from 71 to 115, or from 77 to 100, or from 77 to 95. In another embodiment, the composition has an RR from 72 to 98, or from 80 to 92, or from 82 to 92.

In another embodiment, the composition has an RR from 67 to 87. In another embodiment, the composition has an RR from 80 to 90.

In an embodiment, the composition has a phase angle δ from 20°, or 25°, or 30°, or 32° to 33°, or 34°, or 35°, or 36°, or 37°, or 38°, or 39°. In a further embodiment, the composition has a phase angle δ from 30° to 39°, or from 32° to 39°, or from 35° to 39°, or from 35° to 38°.

In another embodiment, the composition has a phase angle δ from 36° to 39°, or from 36° to 38°, or from 34° to 38°.

The composition has a zero shear viscosity that is the complex viscosity measured at 0.1 inverse seconds (1/s) and 125° C. In an embodiment, the composition has a zero shear viscosity from 270 kPa·s, or 305 kPa·s, or 427 kPa*s to 440 kPa·s, or 610 kPa·s, or 670 kPa·s. In a further embodiment, the b-EPDM has a zero shear viscosity from 270 to 670 kPa·s, or from 305 to 610 kPa·s.

In an embodiment, the composition has a density from greater than, or equal to 0.85 g/cc, or 0.86 g/cc to less than, or equal to, 0.88 g/cc or 0.89 g/cc. In a further embodiment, the composition has a density from 0.85 to less than 0.89 g/cc, or from 0.86 to 0.88 g/cc.

In an embodiment, the composition has a vanadium content from greater than, or equal to, 0 parts per million (ppm), or 0.1 ppm to less than, or equal to, 0.7 ppm or 0.82 ppm, or 0.9 ppm. In a further embodiment, the composition has a vanadium content from 0 to 0.9 ppm or from 0 ppm to less than 0.82 ppm. In an embodiment, the composition comprises vanadium in an amount less than 0.82 ppm.

In an embodiment, the composition has a chlorine content from greater than, or equal to, 0 parts per million (ppm), or 10 ppm to 15 ppm, or 30 ppm. In a further embodiment, the composition has a chlorine content from 0 to 30 ppm or from 0 to 15 ppm.

In an embodiment, the composition includes from 10 wt % to 70 wt % of the b-EPDM and from 90 wt % to 30 wt % of the nr-EPDM, the composition having one, some, or all of the following properties:
(i) a Mooney viscosity, ML(1+4) at 125° C., from 79 to 108 MU; and/or
(ii) a rheology ratio V0.1/V100 at 125° C. (RR) from 71 to 100; and/or
(iii) a phase angle δ from 35° to 38°; and/or
(iv) a Mooney relaxation area (MLRA), from 720 to 1300 MU·s; and/or
(v) an MLRA/ML ratio from 9.7 to 16.0 s; and/or
(vi) a density from greater than, or equal to 0.85 g/cc to less than, or equal to, 0.89 g/cc; and/or
(vii) a vanadium content from greater than, or equal to, 0 ppm to less than, or equal 0.9 ppm; and/or
(viii) a chlorine content from greater than, or equal to, 0 ppm or 30 ppm.

In an embodiment, the composition includes from 10 wt % to 70 wt % of the b-EPDM and from 90 wt % to 30 wt % of the nr-EPDM, the composition having one, some, or all of the following properties:
(i) a Mooney viscosity, ML(1+4) at 125° C., from 79 to 108 MU; and/or
(ii) a rheology ratio V0.1/V100 at 125° C. (RR) from 77 to 100; and/or
(iii) a phase angle δ from 35° to 38°; and/or
(iv) a Mooney relaxation area (MLRA), from 720 to 1300 MU·s; and/or
(v) an MLRA/ML ratio from 9.7 to 16.0 s; and/or
(vi) a density from 0.86 to 0.88 g/cc; and/or
(vii) a vanadium content from greater than, or equal to, 0 ppm to less than, or equal 0.9 ppm; and/or
(viii) a chlorine content from greater than, or equal to, 0 ppm or 30 ppm.

In an embodiment, the composition includes from 30 wt % to 70 wt % of the b-EPDM and from 70 wt % to 30 wt % of the nr-EPDM, the composition having one, some, or all of the following properties:
(i) a Mooney viscosity, ML(1+4) at 125° C., from 81 to 108 MU; and/or
(ii) a rheology ratio V0.1/V100 at 125° C. (RR) from 71 to 95; and/or
(iii) a phase angle δ from 35° to 38°; and/or
(iv) a Mooney relaxation area (MLRA), from 750 to 1270 MU·s; and/or
(v) an MLRA/ML ratio from 10.0 to 14.0 s; and/or
(vi) a density from 0.86 to 0.88 g/cc; and/or
(vii) a vanadium content from greater than, or equal to, 0 ppm to less than, or equal 0.82 ppm; and/or
(viii) a chlorine content from greater than, or equal to, 0 ppm or 15 ppm.

In an embodiment, the composition is an oil-free blend of the neat nr-EPDM and the neat b-EPDM. The term "oil-free blend," as used herein, is a composition that includes only the neat nr-EPDM and the neat b-EPDM to the exclusion of any other components.

Additives

The present composition may optionally contain one or more additives.

In an embodiment, the composition includes the nr-EPDM, the b-EPDM and an oil. The nr-EPDM can be any nr-EPDM previously disclosed herein. The b-EPDM can be any b-EPDM previously disclosed herein. Oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and combinations thereof. In a further embodiment, the oil is selected from the group consisting of SUNPAR 2280, PARALUX 6001, HYDROBRITE 550, and CALSOL 5550.

In an embodiment, the composition comprises the oil in an amount from 5 wt %, or 15 wt %, or 20 wt % to 30 wt %, or 40 wt %, or 70 wt % based a total weight of the composition. In a further embodiment, the composition comprises the oil in an amount from 5 to 70 wt %, or from 15 to 40 wt %, or from 20 to 30 wt % based a total weight of the composition.

The oil may comprise a combination of two or more embodiments as described herein.

In an embodiment, the composition includes the nr-EPDM, the b-EPDM and an additive. The nr-EPDM can be any nr-EPDM previously disclosed herein. The b-EPDM can be any b-EPDM previously disclosed herein. Suitable additives include, but are not limited to, fillers, antioxidants and antiozonants, UV stabilizers, flame retardants, colorants or pigments, curing agents (e.g., sulphur, peroxides), accelerators, coagents, processing aids, blowing agents, plasticizers and combinations thereof.

Fillers include, but are not limited to, carbon black; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; polyethylene glycol (PEG); sulfur; stearic acid; sulfonamide; alumina trihydrate; magnesium hydroxide; precipitated silica; fumed silica; natural fibers; synthetic fibers; and combinations thereof.

Antioxidants and antiozonants include, but are not limited to, hindered phenols, bisphenols, and thiobisphenols; and substituted hydroquinones.

In an embodiment, the composition includes the nr-EPDM, the b-EPDM and calcium carbonate. In an embodiment, the calcium carbonate is present in an amount from 5 wt %, or 15 wt %, or 20 wt % to 30 wt %, or 40 wt %, or 70 wt % based a total weight of the composition. In a further embodiment, the calcium carbonate is present in an amount from 5 to 70 wt %, or from 15 to 40 wt %, or from 20 to 30 wt % based a total weight of the composition.

In an embodiment, the composition includes the nr-EPDM, the b-EPDM and carbon black. In an embodiment, the carbon black is present in an amount from 5 wt %, or 15 wt %, or 20 wt % to 30 wt %, or 40 wt %, or 70 wt % based a total weight of the composition. In a further embodiment, the carbon black is present in an amount from 5 to 70 wt %, or from 15 to 40 wt %, or from 20 to 30 wt % based a total weight of the composition.

In an embodiment, the composition comprises an aggregate additive load, the load excluding calcium carbonate and carbon black. In an embodiment, the aggregate additive load is present in an amount from 0.5 wt %, or 1 wt %, or 2 wt % to 4 wt %, or 5 wt %, or 10 wt % based a total weight of the composition. In a further embodiment, the aggregate additive load is present in an amount from 0.5 to 10 wt %, or from 1 to 5 wt %, or from 2 to 4 wt % based a total weight of the composition.

The additive may comprise two or more embodiments disclosed herein.

The aggregate additive load may comprise two or more embodiments disclosed herein.

The composition is prepared by blending the nr-EPDM and the b-EPDM in a mixer. Nonlimiting examples of a suitable mixer include a batch mixer, a continuous mixer, and a two roll mill.

In an embodiment, the composition is prepared in a batch mixer. The batch mixer may be an internal mixer that includes a rotor arrangement. The rotor arrangement may be tangential or intermeshing. Suitable internal batch mixers include the mixers available commercially from H. F. Mixing, for example.

In an embodiment, the composition is prepared in a continuous mixer. Nonlimiting examples of a suitable continuous mixer include a single screw extruder and a twin screw extruder. In an embodiment, the continuous mixer is a commercially available mixer such as a Farrel Continuous Mixer, for example.

In an embodiment, the nr-EPDM and the b-EPDM are blended in the mixer at a temperature from 60° C., or 70° C., or 80° C., or 90° C., or 100° C. to 110° C., or 130° C., or 150° C., or 170° C., or 200° C. In a further embodiment, the nr-EPDM and the b-EPDM are blended in the mixer at a temperature from 60° C. to 200° C., or from 80° C. to 150° C.

In an embodiment, the composition is prepared in the mixer by blending the oil, additives, or a combination thereof with the nr-EPDM and the b-EPDM.

In an embodiment, a pre-blend of only the nr-EPDM and the b-EPDM is prepared by blending in the mixer. In a second step, the oil, additives, or a combination thereof is added to the mixer containing the pre-blend and the mixture of ingredients formed thereby is blended to form the composition.

In an embodiment, the oil, additives, or a combination thereof is added to the mixer along with the unblended nr-EPDM and b-EPDM. The mixture of ingredients formed thereby is blended simultaneously in a single blending step.

In an embodiment, the composition is prepared with a multiple step mixing process. The multiple step mixing process includes use of at least two mixers selected from the batch mixer, the continuous mixer, and the two roll mill. In an embodiment, the multiple step mixing process includes sequential addition of the oil, additives, or a combination thereof, as described herein.

The composition may comprise two or more embodiments disclosed herein.

The composition can be used to form an article. Nonlimiting examples of articles that can be formed with the composition include belts, cable, extruder profiles, hose, molded goods, roofing membranes, sponges, tires, weather stripping, and wire.

The present disclosure is described more fully through the following examples. Unless otherwise noted, all parts and percentages are by weight.

EXAMPLES

The starting materials used to formulate the Comparative Samples ("CS") and the Inventive Examples ("IE") are provided in Tables 1 and 2 below.

TABLE 1

| nr-EPDM Tradename | $C_2H_4$ (wt %) | ENB (wt %) | MV (MU) | MLRA, (MU·s) | MLRA/ML (s) | RR | δ (°) | Complex Viscosity @ 0.11/s, 125° C. (kPa·s) | density (g/cc) | V (ppm) | Cl (ppm) | Supplier |
|---|---|---|---|---|---|---|---|---|---|---|---|---|
| NORDEL 4570 | 50 | 4.9 | 68.6 | 225 | 3.3 | 56.2 | 46 | 321.6 | 0.86 | <0.82 | <5 | Dow Inc. |
| NORDEL 4785 | 67.5 | 5.0 | 58.6 | 276 | 3.3 | 43.6 | 49 | 304.2 | 0.88 | <0.82 | 6.5 | Dow Inc. |
| NORDEL 4760 | 68 | 4.9 | 83.8 | 298 | 5.1 | 44.7 | 46 | 250.9 | 0.88 | <0.82 | 7.6 | Dow Inc. |
| NORDEL 6565 | 55 | 8.5 | 65.5 | 472 | 7.2 | 63.5 | 41 | 330 | 0.86 | <0.82 | <5 | Dow Inc. |
| Royalene 547 | 63 | 10 | 83.3 | 1045 | 12.5 | 145.0 | 37 | 455.2 | 0.86 | 3.71 | 546 | Lion Copolymer |
| Royalene 539 | 70.6 | 4.6 | 68.3 | 332 | 4.9 | 48.5 | 48 | 314.8 | 0.87 | 4.59 | 57.1 | Lion Copolymer |

The starting nr-EPDMs are used as received from the supplier listed in Table 1.

The starting b-EPDMs shown in Table 2 are produced as disclosed in U.S. Patent Application No. 62/866,766, filed on Jun. 26, 2019, the entire contents of which is incorporated by reference herein.

TABLE 2

| b-EPDM ID: [e-beam dosage (MRad)] | MV (MU) | MLRA, (MU·s) | MLRA/ML (s) | RR | δ (°) | MWD | density (g/cc) | ZSV* (kPa·s) | V (ppm) | Cl (ppm) | M-REC (%) | C2 (wt %) | C3 (wt %) | ENB (wt %) |
|---|---|---|---|---|---|---|---|---|---|---|---|---|---|---|
| NORDEL 4725: [0.3] | 28.7 | 90 | 3.1 | 42.3 | 41 | 3.39 | 0.88 | 151.2 | N.M. | N.M. | 100 | 71.91 | 23.28 | 4.82 |
| NORDEL 4725: [0.7] | 36.9 | 242 | 6.6 | 62.2 | 36 | 4.19 | 0.88 | 228.7 | N.M. | N.M. | 100 | 71.55 | 23.51 | 4.94 |
| NORDEL 4725: [1.1] | 48.3 | 635 | 13.1 | 93.8 | 32 | 5.56 | 0.88 | 351.3 | N.M. | N.M. | N.M. | 71.44 | 23.82 | 4.74 |
| NORDEL 4725: [1.5] | 79.9 | 1818 | 22.8 | 123.9 | 26 | N.M. | 0.88 | 462.1 | N.M. | N.M. | <85 | N.M. | N.M. | N.M. |

TABLE 2-continued

| b-EPDM ID: [e-beam dosage (MRad)] | MV (MU) | MLRA, (MU · s) | MLRA/ML (s) | RR | δ (°) | MWD | density (g/cc) | ZSV* (kPa · s) | V (ppm) | Cl (ppm) | M-REC (%) | C2 (wt %) | C3 (wt %) | ENB (wt %) |
|---|---|---|---|---|---|---|---|---|---|---|---|---|---|---|
| NORDEL 4760: [0.3] | 66.9 | 423 | 6.3 | 60.4 | 40 | 3.05 | 0.88 | 331.1 | <0.82 | <5 | 99 | 68.14 | 27.2 | 4.66 |
| NORDEL 4760: [0.5] | 78.5 | 828 | 10.5 | 79.2 | 35 | 3.61 | 0.88 | N.M. | N.M. | N.M. | 97 | N.M. | N.M. | N.M. |
| NORDEL 4760: [0.7] | 81.1 | 937 | 11.5 | 84.2 | 34 | 3.77 | 0.88 | 468.2 | <0.82 | <5 | 98 | 68.04 | 27.19 | 4.77 |
| NORDEL 4760: [1.0] | 127 | 2674 | 21.1 | 122.2 | 26 | N.M. | 0.88 | 676.9 | <0.82 | <5 | N.M. | N.M. | N.M. | N.M. |
| NORDEL 4760: [1.5] | 163.1 | 5190 | 31.8 | 155.3 | 22 | N.M. | 0.88 | 825.7 | N.M. | N.M. | <85 | N.M. | N.M. | N.M. |
| NORDEL 4770: [0.3] | 79.2 | 473 | 6.0 | 61.0 | 41 | 3.01 | 0.88 | 392.2 | N.M. | N.M. | 99 | 71.25 | 23.87 | 4.88 |
| NORDEL 4770: [0.7] | 107.4 | 1575 | 14.7 | 102.2 | 31 | 4.28 | 0.88 | 662.0 | N.M. | N.M. | 96 | 71.18 | 24.07 | 4.75 |
| NORDEL 4770: [1.5] | 162.2 | 8308 | 51.2 | N.M. | N.M. | N.M. | 0.88 | N.M. | N.M. | N.M. | <85 | N.M. | N.M. | N.M. |
| NORDEL 4785: [0.3] | 94.2 | 535 | 5.7 | 62.6 | 44 | 2.57 | 0.88 | 452.3 | <0.82 | 8.3 | 97 | 69.14 | 25.81 | 5.05 |
| NORDEL 4785: [0.7] | 120.4 | 1793 | 14.9 | 99.8 | 33 | 3.53 | 0.88 | 721.8 | <0.82 | <5 | 100 | 68.97 | 26.15 | 4.88 |
| NORDEL 4785: [1.5] | 165.1 | 9269 | 56.1 | N.M. | N.M. | N.M. | 0.88 | N.M. | N.M. | N.M. | <85 | N.M. | N.M. | N.M. |
| NORDEL 3745: [0.3] | 48.7 | 221 | 4.5 | 49.3 | 41 | 2.45 | 0.88 | 260.2 | N.M. | N.M. | 100 | 69.94 | 29.74 | 0.31 |
| NORDEL 3745: [0.7] | 53.6 | 349 | 6.5 | 64.0 | 37 | 2.90 | 0.88 | 339.1 | N.M. | N.M. | 100 | 70.07 | 29.61 | 0.32 |
| NORDEL 3745: [1.1] | 62.8 | 629 | 10.0 | 86.9 | 31 | 3.42 | 0.88 | 465.8 | N.M. | N.M. | N.M. | 69.98 | 29.7 | 0.31 |
| NORDEL 3745: [1.5] | 78.4 | 1292 | 16.5 | 126.2 | 25 | N.M. | 0.88 | 633.4 | N.M. | N.M. | <85 | N.M. | N.M. | N.M. |
| NORDEL 6530: [0.3] | 37.0 | 316 | 8.5 | 57.5 | 39 | 3.39 | 0.86 | N.M. | <0.82 | <5 | 88 | 54.62 | 36.91 | 8.47 |
| NORDEL 6530: [0.7] | 47.0 | 661 | 14.1 | 79.1 | 35 | 4.21 | 0.86 | N.M. | <0.82 | <5 | 88 | 54.66 | 37.27 | 8.06 |
| NORDEL 6565: [0.3] | 74.0 | 681 | 9.1 | 81.6 | 37 | 3.12 | 0.86 | N.M. | <0.82 | <5 | 90 | 54.67 | 36.79 | 8.55 |
| NORDEL 6565: [0.7] | 103.0 | 2002 | 19.3 | 106.4 | 32 | 4.30 | 0.86 | 531.9 | <0.82 | 11.6 | 88 | 54.65 | 54.65 | 8.57 |

*Complex Viscosity measured at 0.11/s and 125° C.

Any nr-EPDM of Table 1 may be blended with any b-EPDM of Table 2. Each of Comparative Samples CS1-CS6 and Inventive Examples IE1-IE9 is an oil-free blend of an nr-EPDM and a b-EPDM produced according to the weight percentages listed in Table 3.

Each blend is prepared by mixing the nr-EPDM and the b-EPDM in a BR1600 Banbury mixer with a fill factor of 75% and a rotor speed of 40 rpm. The blend is mixed at a temperature of 90° C. then dropped and collected on a steel pan. The collected product is formed into a flat sheet using a two roll mill. Samples of the flat sheet are prepared for rheological testing.

Table 3 summarizes the physical properties, vanadium content and chlorine content for the blends (Comparative Samples CS1-CS6 and Inventive Examples IE1-IE9).

TABLE 3

| ID | b-EPDM (wt %) | nr-EPDM (wt %) | MV (MU) | MLRA, (MU · s) | MLRA/ML (s) | RR | δ (°) | ZSV* (kPa · s) | density (g/cc) | V (ppm) | Cl (ppm) |
|---|---|---|---|---|---|---|---|---|---|---|---|
| IE1 | NORDEL 4785-0.7 (70%) | NORDEL 4785 (30%) | 107.3 | 1199 | 11.2 | 84.1 | 37 | 609.5 | 0.88 | <0.82 | <6.5 |
| CS1 | NORDEL 4785-0.7 (30%) | NORDEL 4785 (70%) | 89.3 | 481 | 5.4 | 58.5 | 45 | 426.7 | 0.88 | <0.82 | <6.5 |
| IE2 | NORDEL 4785-0.7 (70%) | NORDEL 4570 (30%) | 97.5 | 945 | 9.7 | 87.0 | 38 | 591.6 | 0.87 | <0.82 | <5 |
| CS2 | NORDEL 4785-0.7 (30%) | NORDEL 4570 (70%) | 84.3 | 463 | 5.5 | 67.1 | 44 | 411.3 | 0.87 | <0.82 | <5 |
| CS3 | NORDEL 6565-0.7 (10%) | NORDEL 6565 (90%) | 72.2 | 587 | 8.1 | 65.4 | 41 | 350.8 | 0.88 | <0.82 | <11.6 |
| IE3 | NORDEL 6565-0.7 (30%) | NORDEL 6565 (70%) | 79 | 761 | 9.6 | 77.8 | 38 | 415.5 | 0.88 | <0.82 | <11.6 |
| IE4 | NORDEL 6565-0.7 (50%) | NORDEL 6565 (50%) | 84.4 | 1084 | 12.8 | 86.2 | 37 | 452.7 | 0.88 | <0.82 | <11.6 |
| CS4 | NORDEL 4760-1.0 (10%) | NORDEL 6565 (90%) | 74.1 | 611 | 8.2 | 76.2 | 40 | 399.4 | 0.86 | <0.82 | <5 |

TABLE 3-continued

| ID | b-EPDM (wt %) | nr-EPDM (wt %) | MV (MU) | MLRA, (MU·s) | MLRA/ML (s) | RR | δ (°) | ZSV* (kPa·s) | density (g/cc) | V (ppm) | Cl (ppm) |
|---|---|---|---|---|---|---|---|---|---|---|---|
| IE5 | NORDEL 4760-1.0 (20%) | NORDEL 6565 (80%) | 79.9 | 800 | 10.0 | 85.3 | 37 | 451.3 | 0.86 | <0.82 | <5 |
| IE6 | NORDEL 4760-1.0 (30%) | NORDEL 6565 (70%) | 84.9 | 1028 | 12.1 | 83.5 | 36 | 454.3 | 0.87 | <0.82 | <5 |
| IE7 | NORDEL 4760-1.0 (40%) | NORDEL 6565 (60%) | 90.7 | 1270 | 14.0 | 94.7 | 35 | 516.2 | 0.87 | <0.82 | <5 |
| CS5 | NORDEL 4760-1.0 (10%) | NORDEL 4760 (90%) | 67.5 | 440 | 6.5 | 54.8 | 43 | 305.2 | 0.88 | <0.82 | <7.6 |
| CS6 | NORDEL 4760-1.0 (20%) | NORDEL 4760 (80%) | 73.8 | 708 | 9.6 | 63.1 | 40 | 357.1 | 0.88 | <0.82 | <7.6 |
| IE8 | NORDEL 4760-1.0 (30%) | NORDEL 4760 (70%) | 80.6 | 907 | 11.3 | 71.6 | 38 | 409 | 0.88 | <0.82 | <7.6 |
| IE9 | NORDEL 4760-1.0 (40%) | NORDEL 4760 (60%) | 87.5 | 1120 | 12.8 | 76.3 | 37 | 440.5 | 0.88 | <0.82 | <7.6 |

*Complex Viscosity measured at 0.11/s and 125° C.

It was discovered that a blend of (i) the nr-EPDM and (ii) the b-EPDM in an amount equal to, or greater than, 20 wt % has a useful combination of rheological properties. Each of Inventive Examples IE1-IE9 has a combination of rheological properties characteristic of an EPDM having a highly branched molecular structure. Rheological properties that indicate highly branched molecular structure include: (i) Mooney viscosity (ML 1+4 @ 125° C.) from 70 MU to 110 MU; and/or (ii) MLRA/ML from 8 s to 18 s; and/or (iii) rheology ratio from 65 to 100; and/or (iv) phase angle δ from 30° to 39°.

The combination of rheological properties of the inventive blends is comparable to the combination of rheological properties of an EPDM produced with a Ziegler Natta type catalyst (ZN-EPDM). The inventive blends are distinguished over ZN-EPDM by one or more of: density less than 0.89 g/cc; vanadium content of less than 0.82 ppm; and chlorine content or less than 15 ppm.

It is specifically intended that the present disclosure not be limited to the embodiments and illustrations contained herein, but include modified forms of those embodiments including portions of the embodiments and combinations of elements of different embodiments as come with the scope of the following claims.

The invention claimed is:

1. A composition comprising:
from 20 to 70 weight of a neat non-irradiated ethylene/propylene/non-conjugated polyene terpolymer (nr-EPDM); and
from 80 to 30 weight percent of a neat branched ethylene/propylene/non-conjugated polyene terpolymer (b-EPDM), the b-EPDM comprising
(A) a Mooney viscosity (ML 1+4 @ 125° C.) from 100 MU to 130 MU,
(B) a rheology ratio from 95 to 110,
(C) a phase angle δ from 25° to 39°,
(D) a Mooney Relaxation Area (MLRA) from 1600 MU·s to 3000 MU·s, and
(E) an MLRA/ML ratio from 12 s to 25 s;
the composition is oil-free and comprises
(1) a Mooney viscosity (ML 1+4 @ 125° C.) from 79 MU to 120 MU;
(2) a rheology ratio from 71 to 115; and
(3) a phase angle δ from 30° to 39°.

2. The composition of claim 1 wherein the b-EPDM is a branched ethylene/propylene/5-ethylidene-2-norbornene terpolymer, the b-EPDM comprising
(i) from 50 to 72 weight percent ethylene;
(ii) from 25 to 30 weight percent propylene; and
(iii) from 4.5 to 12 weight percent norbornene.

3. The composition of claim 2 wherein the nr-EPDM is a non-irradiated ethylene/propylene/5-ethylidene-2-norbornene terpolymer, the nr-EPDM comprising
(i) from 50 to 72 weight percent ethylene;
(ii) from 25 to 30 weight percent propylene; and
iii) from 4.5 to 12 weight percent norbornene.

4. The composition of claim 1 wherein the nr-EPDM comprises
(A) a Mooney viscosity (ML 1+4 @ 125° C.) from 50 Mooney Units (MU) to 88 MU;
(B) a rheology ratio from 35 to 70; and
(C) a phase angle δ from 41° to 60°.

5. The composition of claim 1 wherein
the b-EPDM has a density from greater than, or equal to, 0.85 g/cc and less than 0.89 g/cc;
the b-EPDM has a chlorine content from greater than, or equal to, 0 parts per million (ppm) to less than, or equal to, 30 parts per million (ppm);
the nr-EPDM has a density from greater than, or equal to, 0.85 g/cc and less than 0.89 g/cc; and
the nr-EPDM has a chlorine content from greater than, or equal to, 0 parts per million (ppm) to less than, or equal to, 30 parts per million (ppm).

6. The composition of claim 1 comprising 70 weight percent b-EPDM and 30 weight percent nr-EPDM, the composition comprising
(A) a Mooney viscosity (ML 1+4 @ 125° C.) from 95 MU to 115 MU;
(B) a rheology ratio from 80 to 92; and
(C) a phase angle δ from 36° to 39°.

7. The composition of claim 1 comprising 50 weight percent b-EPDM and 50 weight percent nr-EPDM, the composition comprising
(A) a Mooney viscosity (ML 1+4 @ 125° C.) from 80 MU to 90 MU;
(B) a rheology ratio from 82 to 92; and
(C) a phase angle δ from 36° to 38°.

8. The composition of claim 1 comprising 40 weight percent b-EPDM and 60 weight percent nr-EPDM, the composition comprising
(A) a Mooney viscosity (ML 1+4 @ 125° C.) from 83 MU to 95 MU;
(B) a rheology ratio from 72 to 98; and
(C) a phase angle δ from 34° to 38°.

9. The composition of claim 1 comprising 30 weight percent b-EPDM and 70 weight percent nr-EPDM, the composition comprising
- (A) a Mooney viscosity (ML 1+4 @ 125° C.) from 79 MU to 90 MU;
- (B) a rheology ratio from 71 to 87; and
- (C) a phase angle δ from 35° to 39°.

10. The composition of claim 1 comprising an MLRA/ML ratio from 9.6 s to 16.0 s.

11. The composition of claim 1 comprising a density from greater than, or equal to, 0.85 g/cc and less than 0.89 g/cc.

12. The composition of claim 1 comprising a chlorine content from greater than, or equal to, 0 parts per million (ppm) to less than, or equal to, 30 parts per million (ppm).

13. The composition of claim 3 wherein the b-EPDM comprises from 4.5 to 5.5 weight percent norbornene.

14. The composition of claim 13 wherein the nr-EPDM comprises from 4.5 to 5.5 weight percent norbornene.

\* \* \* \* \*